United States Patent
Matsoff

(10) Patent No.: US 7,527,498 B2
(45) Date of Patent: May 5, 2009

(54) METHOD AND APPARATUS FOR TIMING READING

(75) Inventor: Jane Matsoff, Inver Grove Heights, MN (US)

(73) Assignee: Read Naturally, Mendota Heights, MN (US)

( * ) Notice: Subject to any disclaimer, the term of this patent is extended or adjusted under 35 U.S.C. 154(b) by 573 days.

(21) Appl. No.: 11/087,090

(22) Filed: Mar. 22, 2005

(65) Prior Publication Data

US 2006/0216679 A1 Sep. 28, 2006

(51) Int. Cl.
G09B 17/04 (2006.01)

(52) U.S. Cl. ....................................... 434/179

(58) Field of Classification Search ................ 434/178, 434/179, 180, 181, 182, 183; 708/100, 103, 708/105, 160, 800, 801, 836, 844
See application file for complete search history.

(56) References Cited

U.S. PATENT DOCUMENTS

| | | | | | |
|---|---|---|---|---|---|
| 3,126,648 | A | * | 3/1964 | Strong | 434/183 |
| 3,332,076 | A | * | 7/1967 | Burson, Jr. | 340/384.71 |
| 3,744,157 | A | * | 7/1973 | Dallas | 434/227 |
| 4,001,561 | A | * | 1/1977 | Quaintance | 434/179 |
| 4,022,014 | A | * | 5/1977 | Lowdenslager | 708/111 |
| 4,266,278 | A | * | 5/1981 | Ebihara et al. | 708/139 |
| 4,302,193 | A | | 11/1981 | Haynes | |
| 4,320,767 | A | * | 3/1982 | Villa-Real | 600/493 |
| 4,445,181 | A | * | 4/1984 | Yatman | 705/418 |
| 5,033,966 | A | * | 7/1991 | Behunin | 434/179 |
| 5,147,205 | A | | 9/1992 | Gross et al. | |
| 5,365,068 | A | * | 11/1994 | Dickerson | 250/372 |
| 5,920,838 | A | | 7/1999 | Mostow et al. | |
| 6,017,219 | A | | 1/2000 | Adams, Jr. et al. | |
| 6,378,771 | B1 | * | 4/2002 | Cooper | 235/382 |

(Continued)

OTHER PUBLICATIONS

"Info—Free Reading and Dyslexia Screening Testing Software", [Online], [Archived Feb. 8, 2005]. Retrieved from the Internet: <URL:http://web.archive.org/web/20050208001320/www.readingsuccesslab.com/InstructionsforParents.html>, 2 pgs.

*Primary Examiner*—Kurt Fernstrom
(74) *Attorney, Agent, or Firm*—Schwegman, Lundberg & Woessner, P.A.

(57) ABSTRACT

There is described method and apparatus for timing student reading. According to the method and system it is provided that a timer device is used to time student reading and determine a words read per minute score. According to one example embodiment of the inventive subject matter, the teacher/test administrator sits down with a student. The teacher places reading passage in front of student. The passage may indicate number of words in the passage. The teacher presses the Start/Stop button 108 on the reading timer 100 when the student starts to read. The student reads the entire passage and while they read the time taken is displayed, counting up, on display 102. The teacher presses the Start/Stop 108 button on the timer 100 when the student finishes reading the passage. The teacher uses the numeric keypad 110 on the timer 100 to reflect the number of words read by the student during the timing, and the entered reads read are displayed on the display 104. The teacher presses the Calculate button 112 which calculates the words read on a per minute basis and the number is displayed on the display 106. The teacher presses the Clear button 114 twice to erase all time and words read data.

20 Claims, 3 Drawing Sheets

U.S. PATENT DOCUMENTS

| | | |
|---|---|---|
| 6,409,513 B1 * | 6/2002 | Kawamura et al. .......... 434/178 |
| 6,568,939 B1 * | 5/2003 | Edgar ......................... 434/179 |
| 6,755,657 B1 | 6/2004 | Wasowicz |
| 2003/0193523 A1 | 10/2003 | Johnson |
| 2004/0049391 A1 | 3/2004 | Polanyi et al. |
| 2004/0166481 A1 | 8/2004 | Wen et al. |

* cited by examiner

METHOD AND APPARATUS FOR TIMING READING

TECHNICAL FIELD OF THE INVENTION

This inventive subject matter relates generally to timing devices and more particularly to a reading timer method and apparatus.

BACKGROUND OF THE INVENTION

An increasing amount of student testing is being done in schools throughout the United States and other locations. One common reading fluency test requires a student to read for one minute and then count the number of words they can read correctly in that minute. Frequently, this type of testing uses a fairly common timer that can be set for one minute of time and then emit an audio signal when the minute has expired.

SUMMARY

There is provided example embodiments of method and apparatus for timing student reading and assessing reading proficiency. Instead of requiring the student to stop reading at the end of a prescribed period, the student may be allowed to complete a passage and thereafter the rate of words read per minute or any other rate may be computed.

DETAILED DESCRIPTION

In the following detailed description of exemplary embodiments of the invention, reference is made to the accompanying drawings (where like numbers represent like elements), which form a part hereof, and in which is shown, by way of illustration, specific exemplary embodiments in which the invention may be practiced. These embodiments are described in sufficient detail to enable those skilled in the art to practice the invention. It is to be understood that other embodiments may be utilized and logical, mechanical, electrical or other changes may be made without departing from the scope of the inventive subject matter described herein.

Figure 1A:
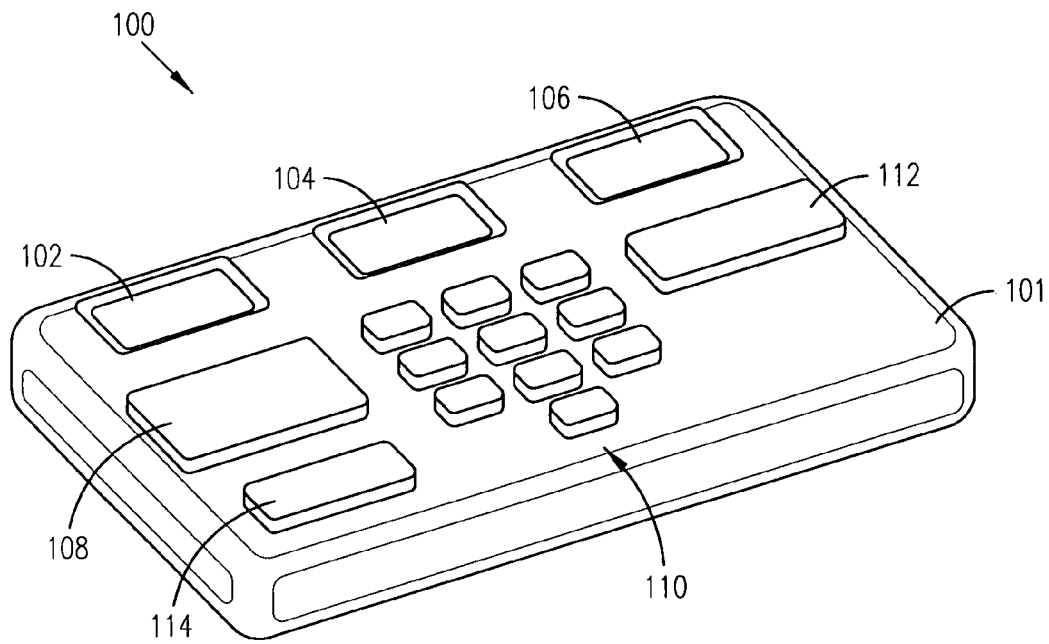
FIG. 1A is a perspective view of a reading timer according to one example embodiment of the inventive subject matter.
Figure 1B:
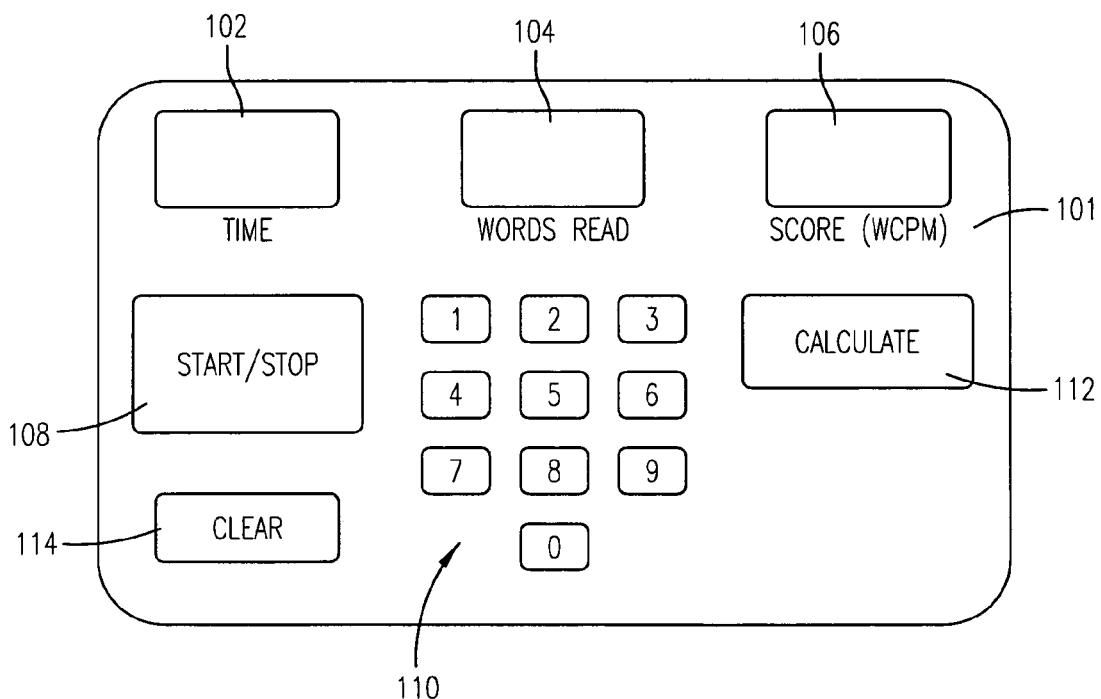
FIG. 1B is a plan view of a reading timer according to one example embodiment of the inventive subject matter.
Figure 1C:
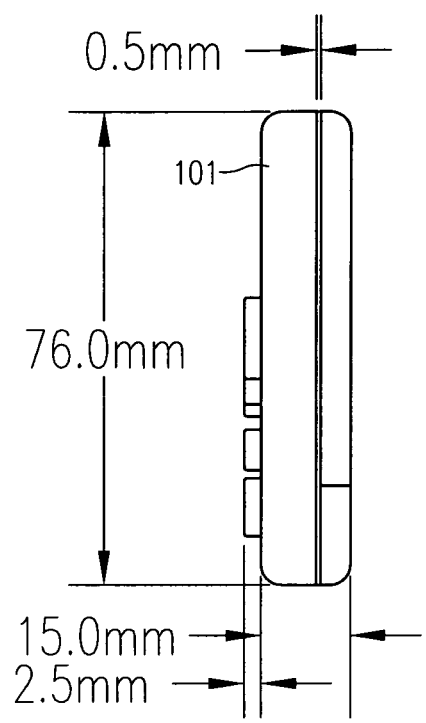
FIG. 1C is a side view of a reading timer according to one example embodiment of the inventive subject matter.

One common reading fluency test measures how many words a student can read correctly in one minute. To administer this test, a student may be asked to read for one minute after which the number of words they read correctly are counted to obtain a words-per-minute score or measurement. Having a student read for one minute, however, will most likely mean that the student reads part, but not all, of a passage. Some teachers want the student to read the entire passage to increase comprehension. However, if the student reads to the end of the passage it will take some amount of time different from one minute. Therefore, getting a standard word per minute score which can be comparable across different passages is difficult. According to one example embodiment of the inventive subject matter illustrated in FIGS. 1A, B, 1C and 1D, there is provided a timer 100 that times a student, counting up in time, until the student is finished. After the student is finished, the number of words read in that time is entered into the timer 100 and it calculates the number of words read on a per minute basis.

Figure 1D:
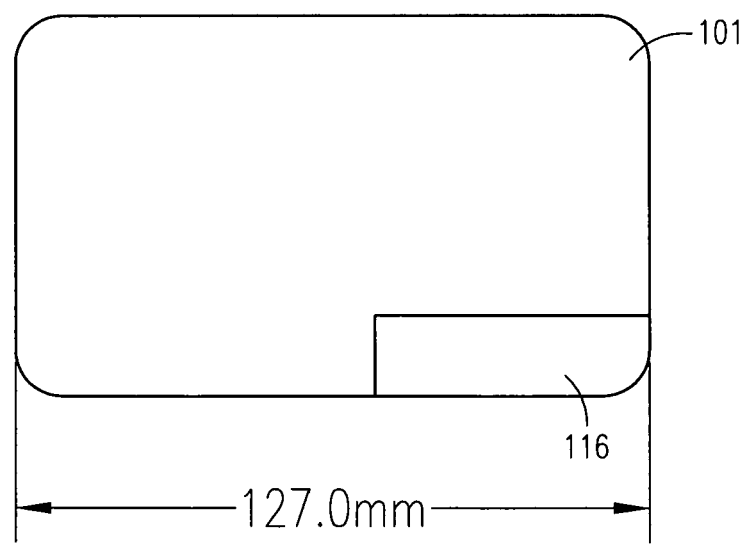
FIG. 1D is a rear view of a timer assembly according to one example embodiment of the inventive subject matter.
Figure 2:
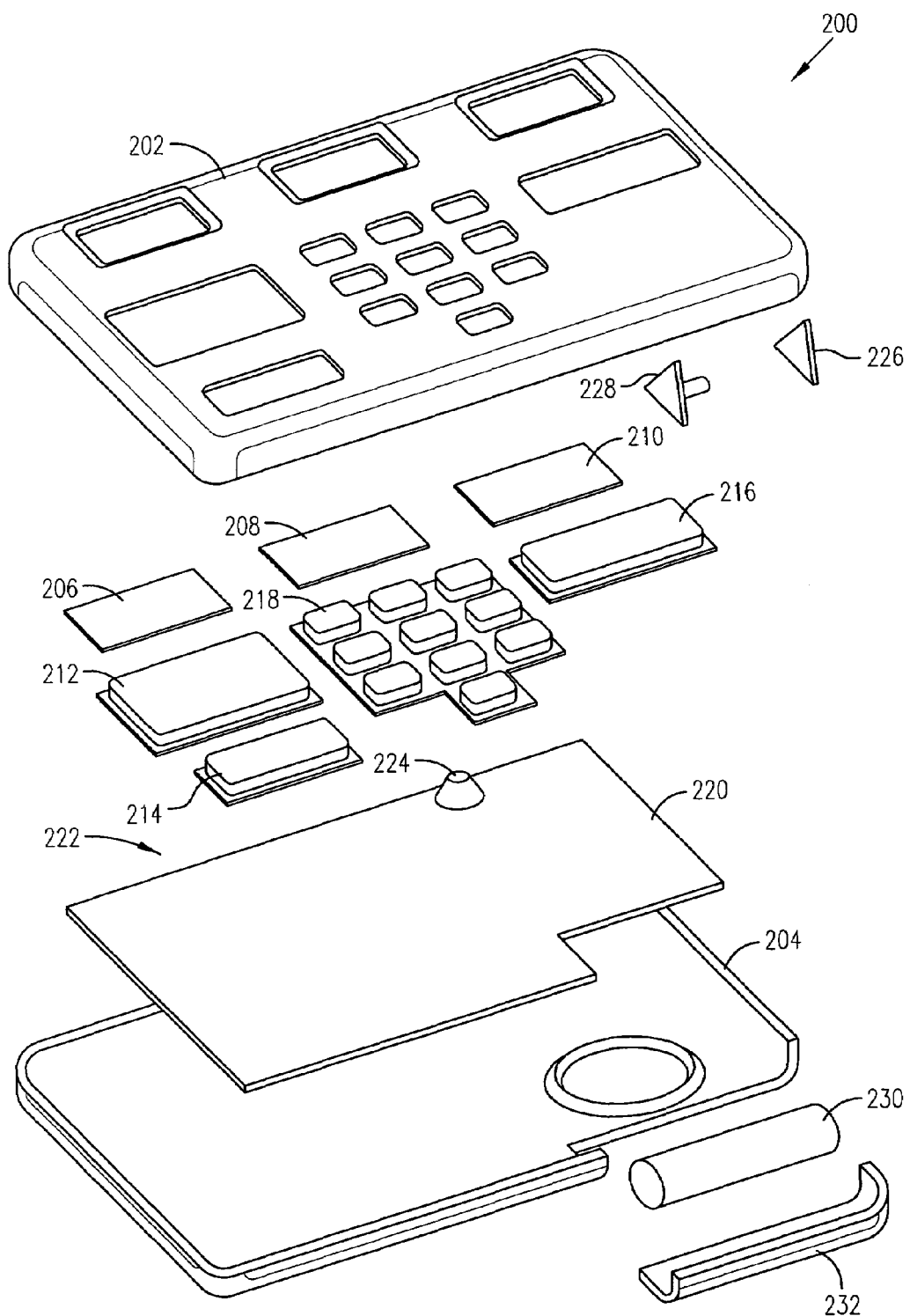
FIG. 2 is an exploded perspective view of a timer assembly according to one example embodiment of the inventive subject matter.

Timer 100 includes a housing 101 including a time display 102, a words read display 104 and a words comprehended per minute (WCPM) display 106. It further includes a Start/Stop button 108, a numeric keypad 110, a Calculate button 112, and a Clear button 114. A battery compartment 116 is also provided as shown in FIG. 1D. As shown in FIG. 2, timer assembly 200 includes a top cover 202, a bottom cover 204, three LCD display units 206, 208 and 210, buttons 212, 214 and 216, and keypad buttons 218. Assembly 200 further includes a printed circuit board (PCB) 220 having mounted thereon one or more integrated circuit devices 222 that can process input from the buttons and control the display of time, words counted and words comprehended per minute. Rubber key detectors 224 are provided to respond to the pressing of the buttons 212-218 to provide input to the integrated circuit devices 222. An anode 226 and cathode 228 are provided to make contact with the poles of a battery 230. A battery door 232 provides for covering the battery compartment 116 (FIG. 1D).

According to a method according to the inventive subject matter, the following actions are performed:

a) The teacher/test administrator sits down with a student;

b) The teacher places reading passage in front of student. The passage may indicate number of words in the passage;

c) The teacher presses the Start/Stop button 108 on the reading timer 100 when the student starts to read;

d) The student reads the entire passage and while they read the time taken is displayed, counting up, on display 102;

e) The teacher presses the Start/Stop 108 button on the timer 100 when the student finishes reading the passage;

f) The teacher uses the numeric keypad 110 on the timer 100 to reflect the number of words read by the student during the timing, and the entered reads read are displayed on the display 104;

g) The teacher presses the Calculate button 112 which calculates the words read on a per minute basis and the number is displayed on the display 106;

h) The teacher presses the Clear button 114 twice to erase all time and words read data.

Thus, as described above, there is provided a method and apparatus for timing student reading and assessing reading proficiency. Instead of requiring the student to stop reading at the end of a prescribed period, the student may be allowed to complete a passage and thereafter the rate of words read per minute or any other rate may be computed. The method and apparatus may, therefore, allow for computing words read per other time periods, for example per hour or other period of choice. According to another example embodiment, the three displays are liquid crystal or LED displays, and may be separate or one display device with three display areas to show the time, words read and score.

While the method and apparatus have been described in some example forms, those of skill in the art will recognize that the inventive subject matter may be implemented or embodied in a variety of other alternate configurations without departing from the spirit and scope of the claims appended hereto.

The invention claimed is:

1. An apparatus comprising:

a housing;

at least one button to start a reading timer;

at least one button to stop the reading timer;

at least one set of numeric keys to enter a number of words read by a reader;

at least one calculate button that is pressed to cause a number of words read per minute to be calculated, the calculate button, upon being pressed, causing an integrated circuit to process information about the number of words read and a time elapsed on the reading timer from the moment the timer is started to the moment the timer is stopped to determine the number of words read per minute; and one or more displays to display the time elapsed on the reading timer, the number of words read by the reader, and the number of words read per minute.

2. The apparatus of claim 1, wherein the one or more displays include a words read display, a words read per minute display, and an elapsed time display.

3. The apparatus of claim 1, wherein the integrated circuit is configured to control the one or more displays.

4. The apparatus of claim 1, comprising a clear button to reset the one or more displays and the information processed by the integrated circuit.

5. The apparatus of claim 1, comprising a power supply including a battery.

6. A method comprising:

providing a reading timer used to calculate a number of words read per minute based on information received by an input mechanism, the input mechanism including at least one button to start the reading timer, at least one button to stop the reading timer, a numeric keypad and a calculate button;

triggering the at least one button to start the reading timer when a reader starts to read;

counting up in time, via the reading timer, until the reader is finished reading;

triggering the at least one button to stop when the reader stops reading; and after triggering the at least one button to stop, entering a number of words read by the reader using the numeric keypad and calculating the number of words read per minute by triggering the calculate button.

7. The method of claim 6, comprising displaying the calculated number of words read per minute on a display.

8. The method of claim 7, comprising maintaining, on the display, the calculated number of words read per minute until cleared by the reader or an observer.

9. The method of claim 8, comprising clearing an integrated process of the information used to calculate the number of words read per minute.

10. The method of claim 6, comprising allowing the reader or an observer to determine a reading stopping point after the at least one button to start has been triggered.

11. The method of claim 10, wherein allowing the reader or the observer to determine the reading stopping point includes increasing the reader's comprehension.

12. The method of claim 6, wherein a time period between triggering the at least one button to start the reading timer and the triggering the at least one button to stop the reading timer includes an amount of time different from one minute.

13. The method of claim 6, wherein entering the number of words read by the reader includes using a word number indicator associated with one or more passages read.

14. The method of claim 6, wherein calculating the number of words read per minute includes generating a score that is comparable across different word count entries.

15. The method of claim 6, wherein counting up in time includes counting up by a single second.

16. An apparatus for determining a number of words read per minute comprising:

a reading timer having an input mechanism including a start/stop button, a numeric keypad and a calculate button;

the numeric keypad configured to receive a number of words read by a reader after an elapsed reading time has been defined, the elapsed reading time including the time period between successive triggering of the start/stop button; and the calculate button, upon being triggered, causing an integrated circuit to process information about the number of words read by the reader and the elapsed reading time to determine a static number of words read per minute.

17. The apparatus of claim 16, comprising a display for the elapsed reading time, the number of words read by the reader, and the number of words read per minute.

18. The apparatus of claim 16, wherein the integrated circuit is configured to determine the number of words read per minute using elapsed reading time information accurate to within one second.

19. The apparatus of claim 18, wherein the one or more displays are configured to display the static number of words per minute until cleared by the reader or an observer.

20. An apparatus comprising:

a housing;

at least one start/stop button alternately operating to start and stop a reading timer;

a display to display the time elapsed on the reading timer from the point the timer is started;

a display to display the words read by a reader;

a display to display the number of words read per minute;

at least one set of numeric keys to enter a number of words read by the reader; and at least one calculate button that is pressed to cause a number of words read per minute to be calculated, the calculated number of words read per minute determined using time elapsed information accurate to within one second.

* * * * *